(12) United States Patent
Zay et al.

(10) Patent No.: US 9,170,680 B2
(45) Date of Patent: Oct. 27, 2015

(54) METHOD, SYSTEM AND COMPUTER PROGRAM PRODUCT FOR OPERATING A TOUCHSCREEN

(71) Applicant: Texas Instruments Incorporated, Dallas, TX (US)

(72) Inventors: Daniel James Zay, Wylie, TX (US); Michel G. Stella, Dallas, TX (US); Melissa Del Carmen Amoros, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/940,502

(22) Filed: Jul. 12, 2013

(65) Prior Publication Data
US 2014/0015809 A1    Jan. 16, 2014

Related U.S. Application Data

(60) Provisional application No. 61/670,872, filed on Jul. 12, 2012.

(51) Int. Cl.
*G06F 3/041* (2006.01)
*G06F 3/0488* (2013.01)
*G06F 3/0484* (2013.01)

(52) U.S. Cl.
CPC ............ *G06F 3/0418* (2013.01); *G06F 3/0488* (2013.01); *G06F 3/04842* (2013.01); *G06F 3/04845* (2013.01); *G06F 3/04886* (2013.01)

(58) Field of Classification Search
CPC ..... G06F 3/0416; G06F 3/0418; G06F 3/048; G06F 3/0481; G06F 3/04812; G06F 3/04817; G06F 3/0482; G06F 3/0484; G06F 3/04842; G06F 3/04845; G06F 3/04847; G06F 3/0485; G06F 3/0486; G06F 3/0488; G06F 3/04886
USPC ............................ 345/173; 715/765, 771, 808
See application file for complete search history.

(56) References Cited

U.S. PATENT DOCUMENTS

| | | | |
|---|---|---|---|
| 6,259,436 B1 * | 7/2001 | Moon et al. .................... | 345/173 |
| 8,423,897 B2 * | 4/2013 | Rendahl ......................... | 715/773 |
| 8,812,973 B1 * | 8/2014 | Cohen et al. ................... | 715/773 |
| 2008/0141149 A1 * | 6/2008 | Yee et al. ....................... | 715/764 |
| 2010/0066694 A1 * | 3/2010 | Jonsdottir ...................... | 345/173 |
| 2010/0134432 A1 * | 6/2010 | Seo ................................ | 345/173 |
| 2011/0181522 A1 * | 7/2011 | Rendahl ......................... | 345/173 |
| 2011/0224896 A1 * | 9/2011 | Napieraj ........................ | 701/200 |
| 2011/0254865 A1 * | 10/2011 | Yee et al. ....................... | 345/661 |
| 2012/0044179 A1 * | 2/2012 | Hudson .......................... | 345/173 |

* cited by examiner

*Primary Examiner* — Tom Sheng
(74) *Attorney, Agent, or Firm* — Michael A. Davis, Jr.; Frank D. Cimino

(57) ABSTRACT

Within a display area of a touchscreen, multiple elements are displayed. A location is detected of a physical touch within the display area. In response to determining that an ambiguity exists about which of the elements is being targeted by the physical touch, a menu is displayed on the touchscreen for prompting a user to select between ones of the elements that are at least partially displayed within a specified area around the location. The ambiguity is resolved by receiving a selection from the user via the menu.

21 Claims, 11 Drawing Sheets

METHOD, SYSTEM AND COMPUTER PROGRAM PRODUCT FOR OPERATING A TOUCHSCREEN

CROSS-REFERENCE TO RELATED APPLICATION

This application claims priority to U.S. Provisional Patent Application Ser. No. 61/670,872, filed Jul. 12, 2012, entitled AMBIGUOUS TOUCH INTERACTION AND APPARATUS IN TOUCH SENSING SYSTEMS, naming Daniel James Zay et al. as inventors, which is hereby fully incorporated herein by reference for all purposes.

BACKGROUND

The disclosures herein relate in general to information handling systems, and in particular to a method, system and computer program product for operating a touchscreen.

For selecting an element of a visual image that is displayed on a touchscreen, a user can physically touch (e.g., single tap, double tap, and/or press-and-hold) a point where such element is displayed on the touchscreen. However, if such point includes multiple elements that are displayed in close proximity to one another (e.g., partially overlap with one another), then ambiguity may exist about which of those elements is being targeted for selection by the user touching such point. For example, even if the touchscreen magnifies (e.g., zooms) the visual image before the user touches such point, those elements may remain in close proximity to one another at such point, so that distinguishing between those elements could remain cumbersome. Moreover, extreme magnification could increase a likelihood of disorienting the user.

SUMMARY

Within a display area of a touchscreen, multiple elements are displayed. A location is detected of a physical touch within the display area. In response to determining that an ambiguity exists about which of the elements is being targeted by the physical touch, a menu is displayed on the touchscreen for prompting a user to select between ones of the elements that are at least partially displayed within a specified area around the location. The ambiguity is resolved by receiving a selection from the user via the menu.

DETAILED DESCRIPTION

Figure 1:
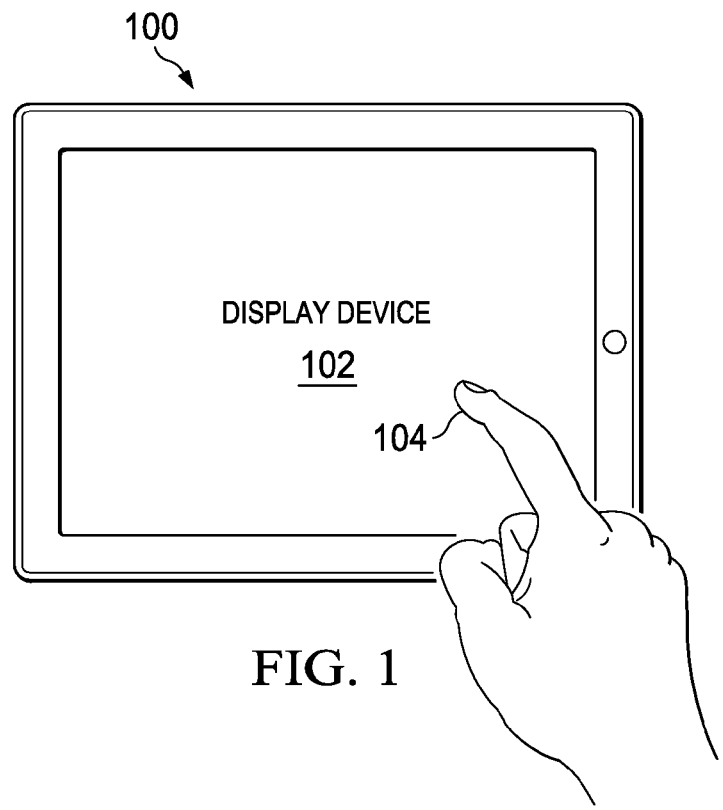
FIG. 1 is a top view of an information handling system of the illustrative embodiments.

FIG. 1 is a top view of an information handling system (e.g., a portable handheld electronics device, such as a tablet computing device, a mobile smartphone, a netbook computer, a laptop computer, or a graphing calculator), indicated generally at 100, of the illustrative embodiments. Accordingly, the system 100 executes various processes and performs operations (e.g., processing, displaying and otherwise communicating information) in response thereto. The system 100 includes a display device 102 for displaying and receiving information.

Figure 2:
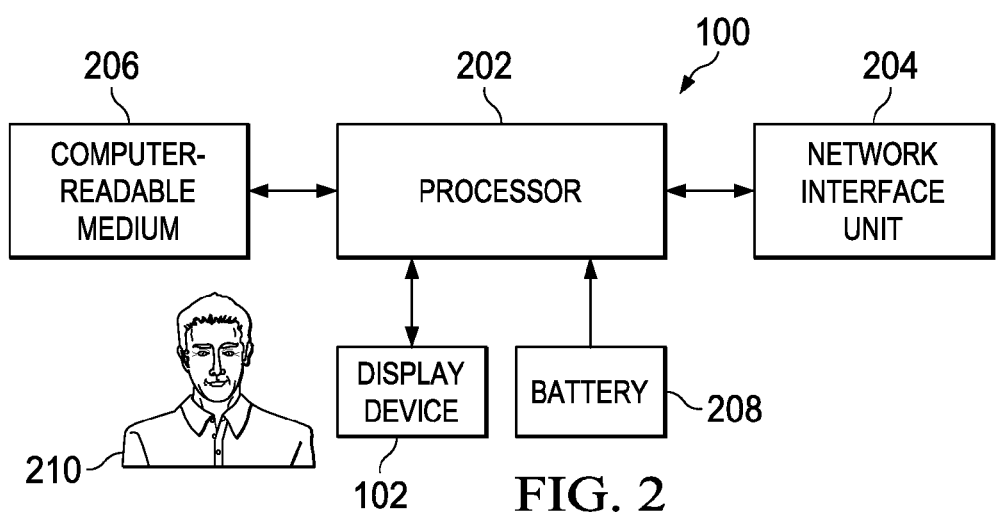
FIG. 2 is a block diagram of the system of FIG. 1.

FIG. 2 is a block diagram of the system 100. The system 100 includes various electronic circuitry components for performing the system 100 operations, implemented in a suitable combination of software, firmware and hardware. Such components include: (a) a processor 202, which is a general purpose computational resource for executing instructions of computer-readable software programs to process data (e.g., a database of information) and perform additional operations (e.g., communicating information) in response thereto; (b) a network interface unit 204 for communicating information to and from a network; (c) a computer-readable medium 206 for storing information, such as a nonvolatile storage device and/or a random access memory ("RAM") device; (d) a battery 208, which is a source of power for the system 100; (e) the display device 102 for displaying information to a human user 210 and for receiving information from the user 210; and (f) other electronic circuitry for performing additional operations. In the illustrative embodiments, the various electronic circuitry components of the system 100 are housed integrally with one another.

Accordingly, the system 100 performs its operations in response to instructions of computer-readable software programs, which are stored on the computer-readable medium 206. Such programs include, but are not limited to: (a) applications, such as applications for word processing, calculator, data collection, lists, statistics, graphing, geometry, querying, polling (e.g., quick polling), and various other functions; (b) a window, dialog and event manager; (c) a settings manager; (d) a power manager; (e) a communication stack; (f) a display driver; (g) a touchpad driver; (h) a universal serial bus ("USB") interface driver; (i) a wireless interface driver; and (j) boot code. Also, the computer-readable medium 206 stores data that are processed by the processor 202, in response to the processor 202 executing such programs.

As shown in FIG. 1, the processor 202 is connected to the display device 102, the computer-readable medium 206, and the battery 208. For clarity, although FIG. 1 shows the battery 208 connected to only the processor 202, the battery 208 is further coupled to various other components of the system 100. Also, the processor 202 is coupled through the network interface unit 204 to the network (not shown in FIG. 1), such as a Transport Control Protocol/Internet Protocol ("TCP/IP") network (e.g., the Internet or an intranet). For example, the network interface unit 204 communicates information by outputting information to, and receiving information from, the processor 202 and the network, such as by transferring information (e.g. instructions, data, signals) between the processor 202 and the network (e.g., wirelessly or through a USB interface).

The system 100 operates in association with the user 210. In response to signals from the processor 202, the display device 102 displays visual images, which represent information, so that the user 210 is thereby enabled to view the visual images. Also, in the illustrative embodiments, the display device 102 is a touchscreen, such as: (a) a liquid crystal display ("LCD") device; and (b) touch-sensitive circuitry of such LCD device, so that the touch-sensitive circuitry is integral with such LCD device. Accordingly, the user 210 operates the display device 102 (e.g., virtual keys thereof, such as a virtual keyboard and/or virtual keypad) for specifying information (e.g., alphanumeric text information) to the processor 202, which receives such information from the display device 102.

For example, referring also to FIG. 1, the display device 102: (a) detects presence and location of a physical touch (e.g., by a finger 104 of the user 210, and/or by a passive stylus object) within a display area of such touchscreen; and (b) in response thereto, outputs signals (indicative of such detected presence and location) to the processor 202. In that manner, the user 210 can physically touch (e.g., single tap, double tap, and/or press-and-hold) the display device 102 to: (a) select a portion (e.g., region) of a visual image that is then-currently displayed by the display device 102; and/or (b) cause the display device 102 to output various information to the processor 202. Accordingly: (a) the processor 202 executes a computer-readable software program; (b) such program is stored on the computer-readable medium 206; and (c) in response to instructions of such program, and in response to such physical touch, the processor 202 causes the display device 102 to display various screens.

Figure 3:
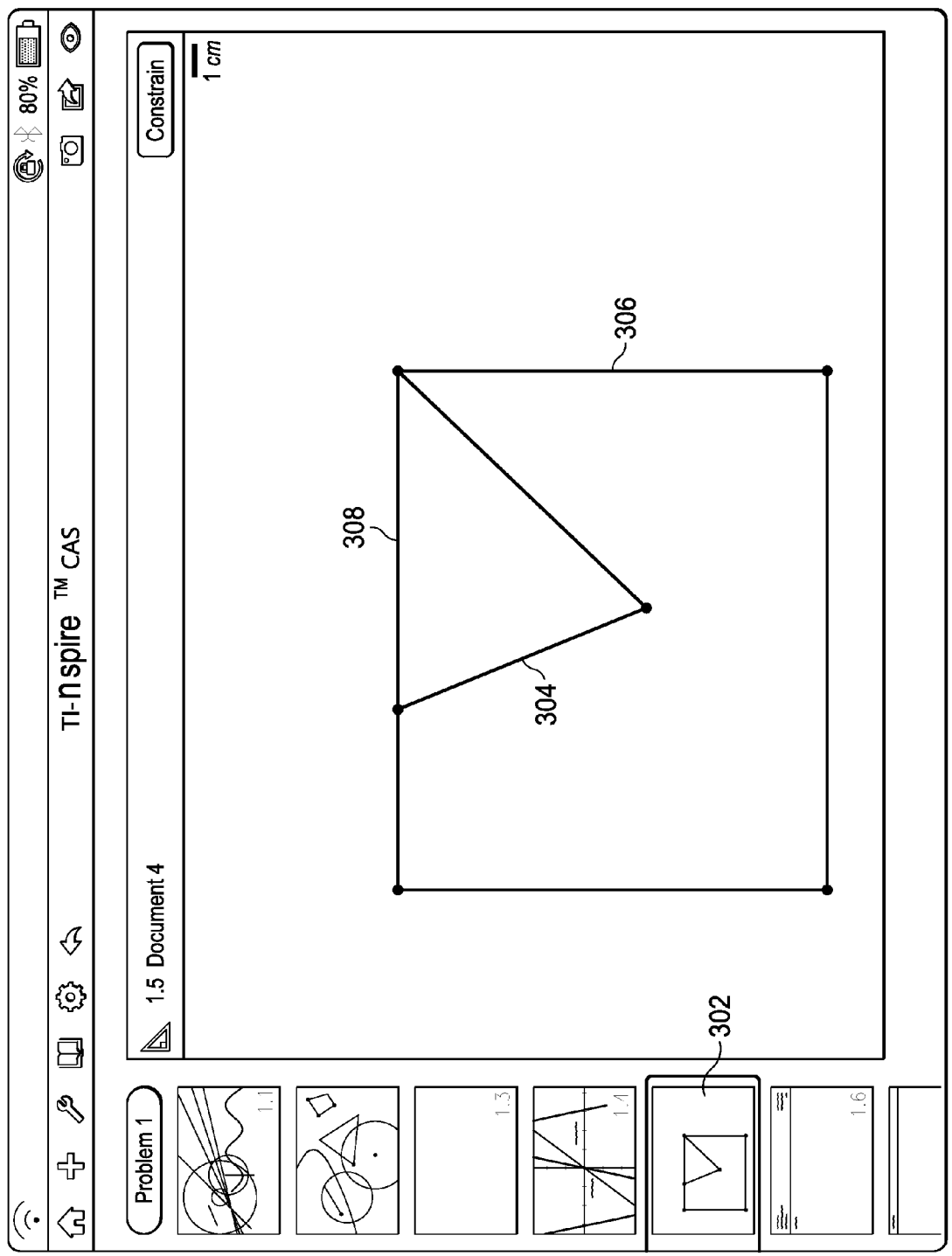
FIG. 3 is a diagram of a first example screen that is displayed by a display device of the system of FIG. 1.

FIG. 3 is a diagram of a first example screen that is displayed by the display device 102. In the example of FIG. 3: (a) the user 210 has physically touched (e.g., single tapped) a portion 302 on the display device 102; and (b) in response thereto, the processor 202 causes the display device 102 to display a triangle 304 and a rectangle 306, which are associated with the selected portion 302, for viewing (on the display device 102) by the user 210. In this example, the triangle 304 and the rectangle 306 are displayed in close proximity to one another (and, in fact, partially overlap with one another), so that a line segment 308 is shared between them. Accordingly, if the user 210 physically touches the line segment 308, then ambiguity exists about which element (e.g., the triangle 304 or the rectangle 306) is being targeted for selection by the physical touch.

Figure 4:
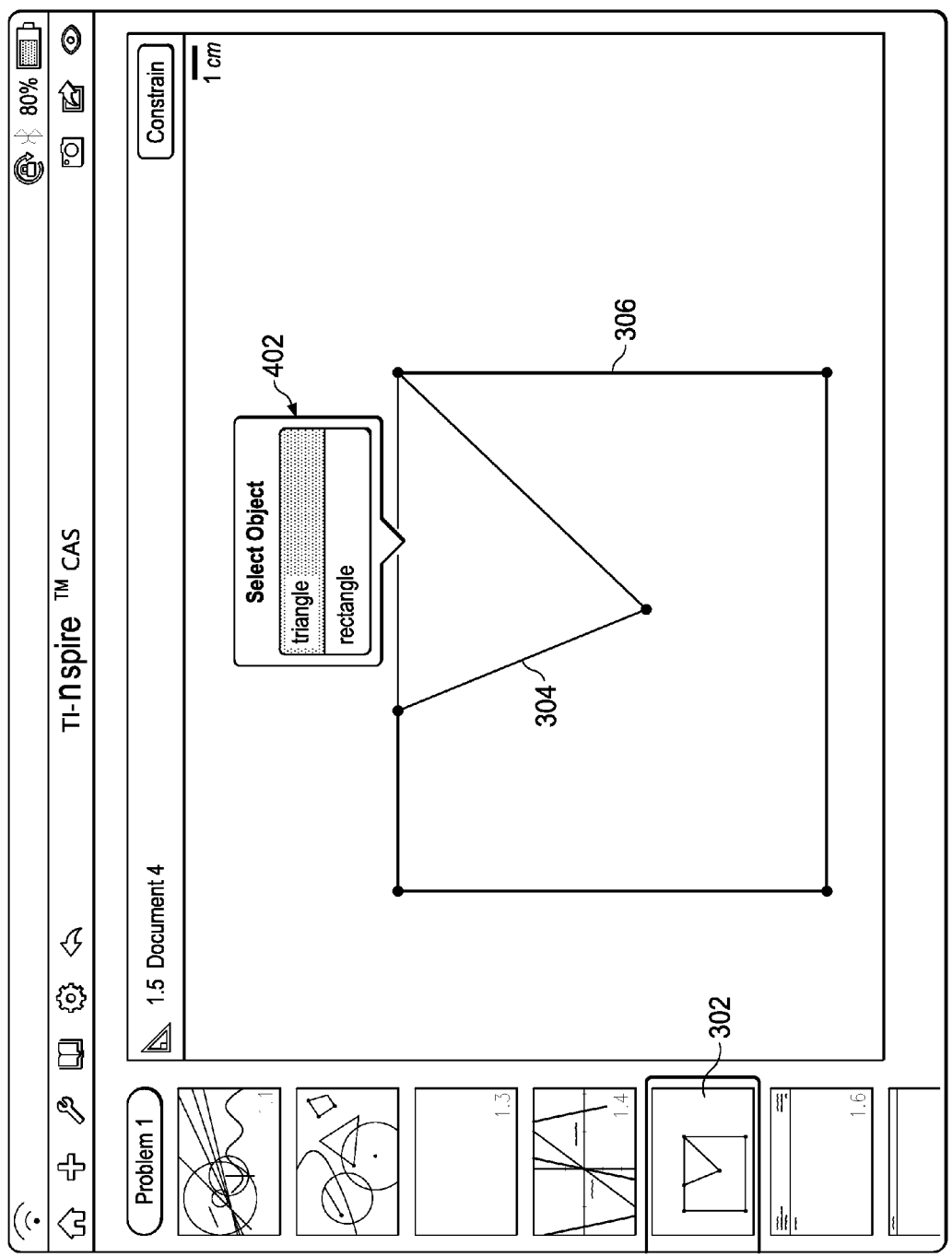
FIG. 4 is a diagram of a second example screen that is displayed by the display device of the system of FIG. 1.
Figure 5:
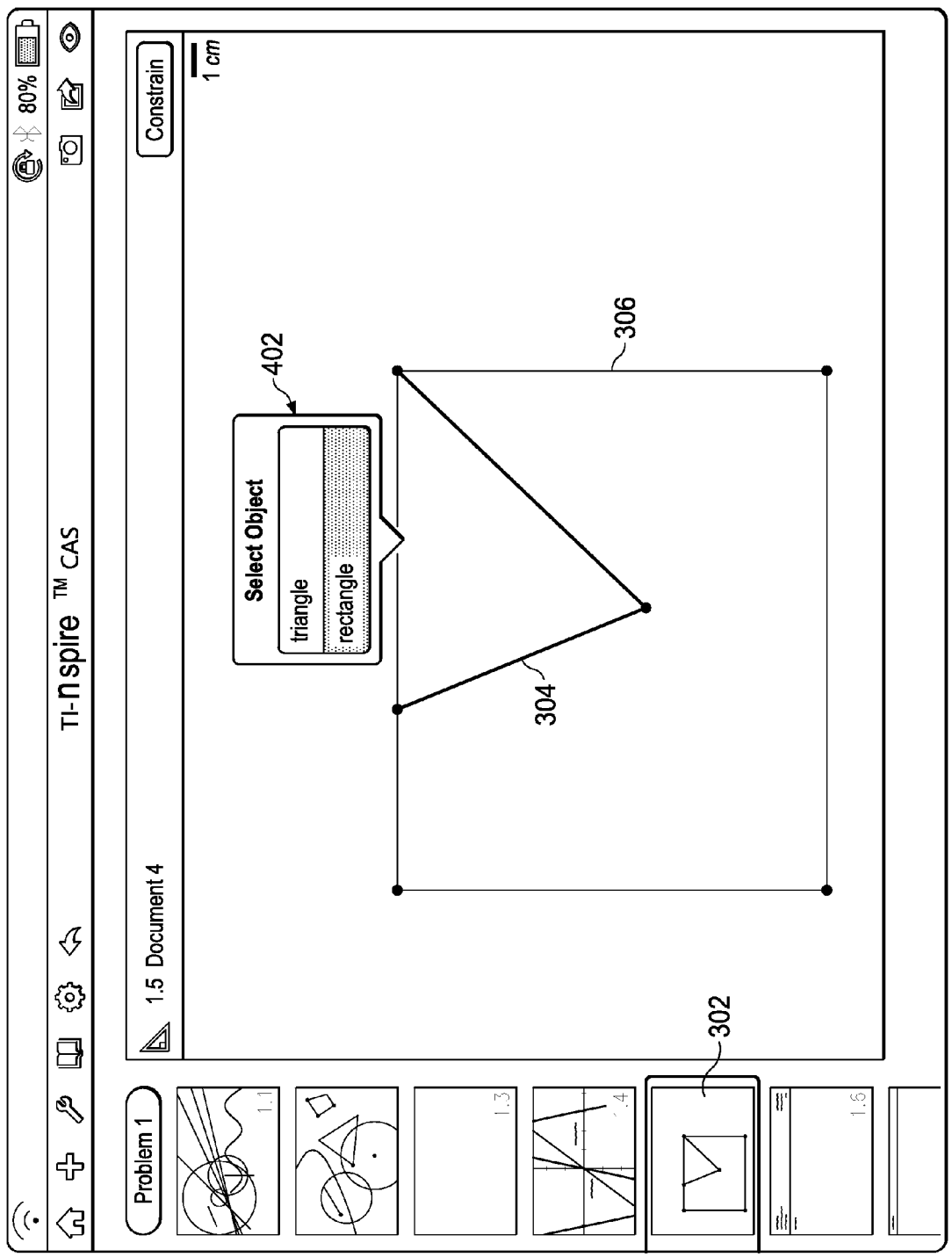
FIG. 5 is a diagram of a third example screen that is displayed by the display device of the system of FIG. 1.

FIG. 4 is a diagram of a second example screen that is displayed by the display device 102. FIG. 5 is a diagram of a third example screen that is displayed by the display device 102. In the example of FIGS. 4 and 5: (a) the user 210 has physically touched the line segment 308 (FIG. 3) on the display device 102, so that ambiguity exists about which element (e.g., the triangle 304 or the rectangle 306) is being targeted for selection by the physical touch; (b) in response thereto, the processor 202 causes the display device 102 to display a pop-up menu 402 for prompting the user 210 to select between such elements; and (c) the processor 202 resolves such ambiguity by receiving (from the user 210 via the menu 402) the selection between such elements, which are identified within the menu 402.

As shown in FIG. 4, the processor 202 initially causes the display device 102 to highlight (e.g., by shading, bolding and/or blinking): (a) "triangle" text (instead of "rectangle" text) within the menu 402; and (b) the triangle 304 (instead of the rectangle 306), so that the processor 202 enables the user 210 to visually associate the triangle 304 with such "triangle" text. In an alternative example, as shown in FIG. 5, the processor 202 initially causes the display device 102 to highlight (e.g., by shading): (a) the "rectangle" text (instead of the "triangle" text) within the menu 402; and (b) the rectangle 306 (instead of the triangle 304), so that the processor 202 enables the user 210 to visually associate the rectangle 306 with such "rectangle" text.

If the display device 102 is displaying the example screen of FIG. 4, and if the user 210 single taps the "rectangle" text within the menu 402, then the processor 202 causes the display device 102 to instead display the example screen of FIG. 5 in response to such tapping, so that the processor 202 enables the user 210 to visually associate the rectangle 306 with such "rectangle" text. Conversely, if the display device 102 is displaying the example screen of FIG. 5, and if the user 210 single taps the "triangle" text within the menu 402, then the processor 202 causes the display device 102 to instead display the example screen of FIG. 4 in response to such tapping, so that the processor 202 enables the user 210 to visually associate the triangle 304 with such "triangle" text.

In response to the user 210 physically touching the highlighted "triangle" text (FIG. 4) within the menu 402, the processor 202 resolves such ambiguity by determining that the user 210 is selecting the triangle 304. Similarly, in response to the user 210 physically touching the highlighted "rectangle" text (FIG. 5) within the menu 402, the processor 202 resolves such ambiguity by determining that the user 210 is selecting the rectangle 306. In that manner, the processor 202 receives (from the user 210 via the menu 402) the selection between the triangle 304 and the rectangle 306, without requiring the user 210 to zoom (or, subsequently, to reverse zoom) such elements as displayed by the display device 102.

Figure 6:
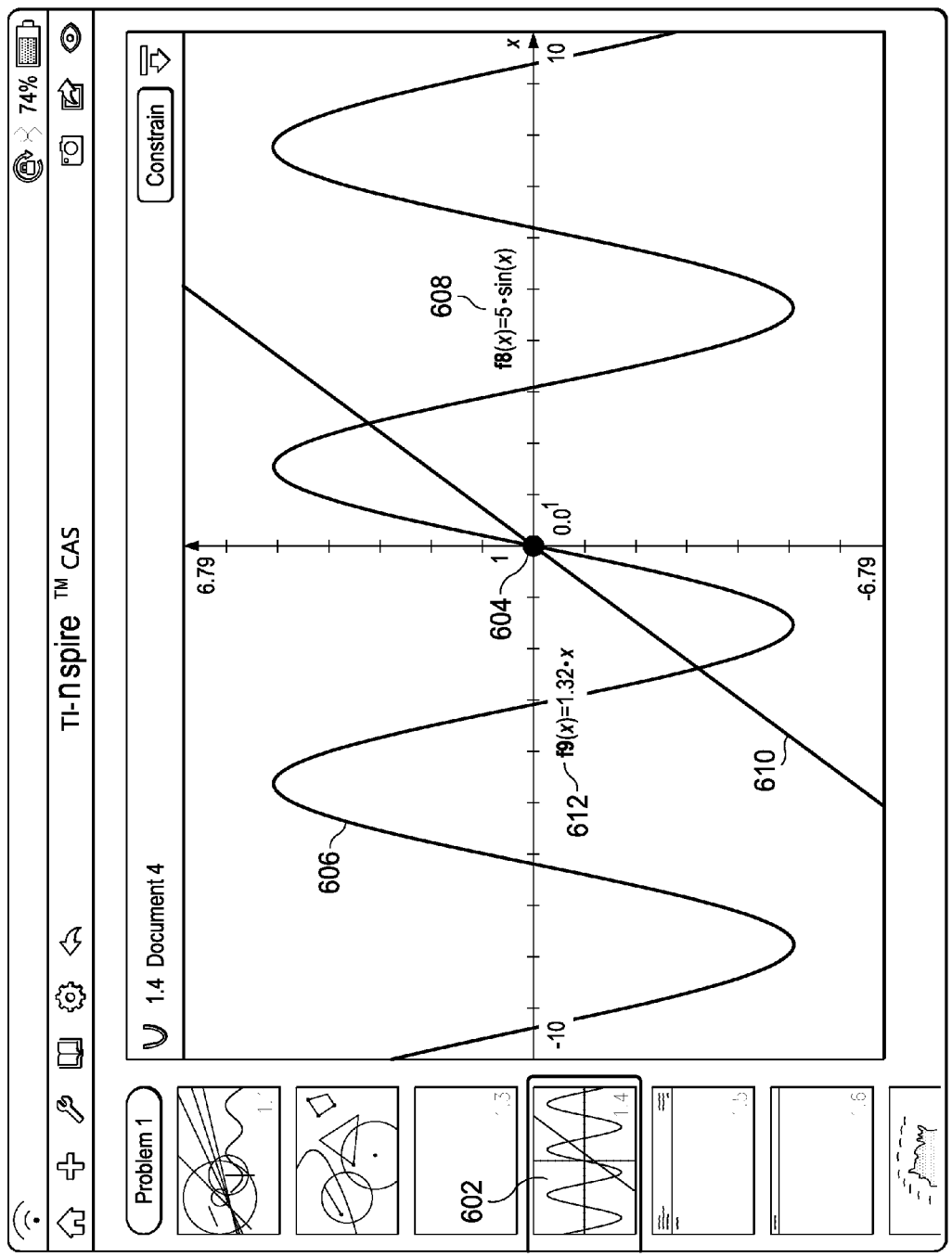
FIG. 6 is a diagram of a fourth example screen that is displayed by the display device of the system of FIG. 1.

FIG. 6 is a diagram of a fourth example screen that is displayed by the display device 102. In the example of FIG. 6: (a) the user 210 has physically touched (e.g., single tapped) a portion 602 on the display device 102; and (b) in response thereto, the processor 202 causes the display device 102 to display a graph, which is associated with the selected portion 602, for viewing (on the display device 102) by the user 210. Such graph includes: (a) a point 604 at a coordinate (0,0); (b) a sine wave 606; (c) text 608 that describes a function $f8(x)=5 \cdot \sin(x)$ of the sine wave 606; (d) a line 610; and (e) text 612 that describes a function $f9(x)=1.32 \cdot x$ of the line 610. In this example, the point 604, the sine wave 606 and the line 610 are displayed in close proximity to one another (and, in fact, partially overlap with one another), so that at least the coordinate (0,0) is shared between them. Accordingly, if the user 210 physically touches the coordinate (0,0), then ambiguity exists about which element (e.g., the point 604, the sine wave 606, the text 608, the line 610 or the text 612) is being targeted for selection by the physical touch.

Figure 7:
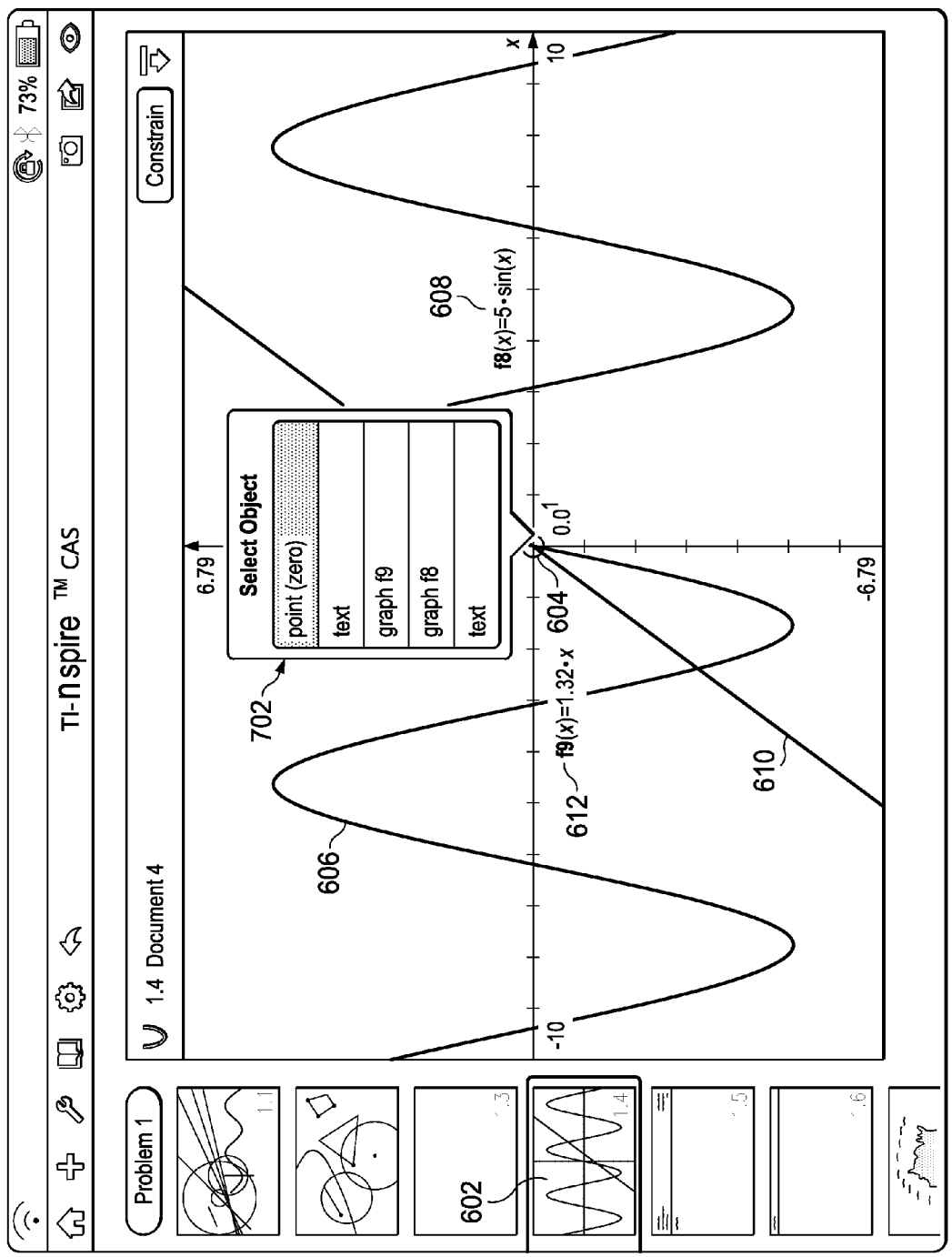
FIG. 7 is a diagram of a fifth example screen that is displayed by the display device of the system of FIG. 1.
Figure 8:
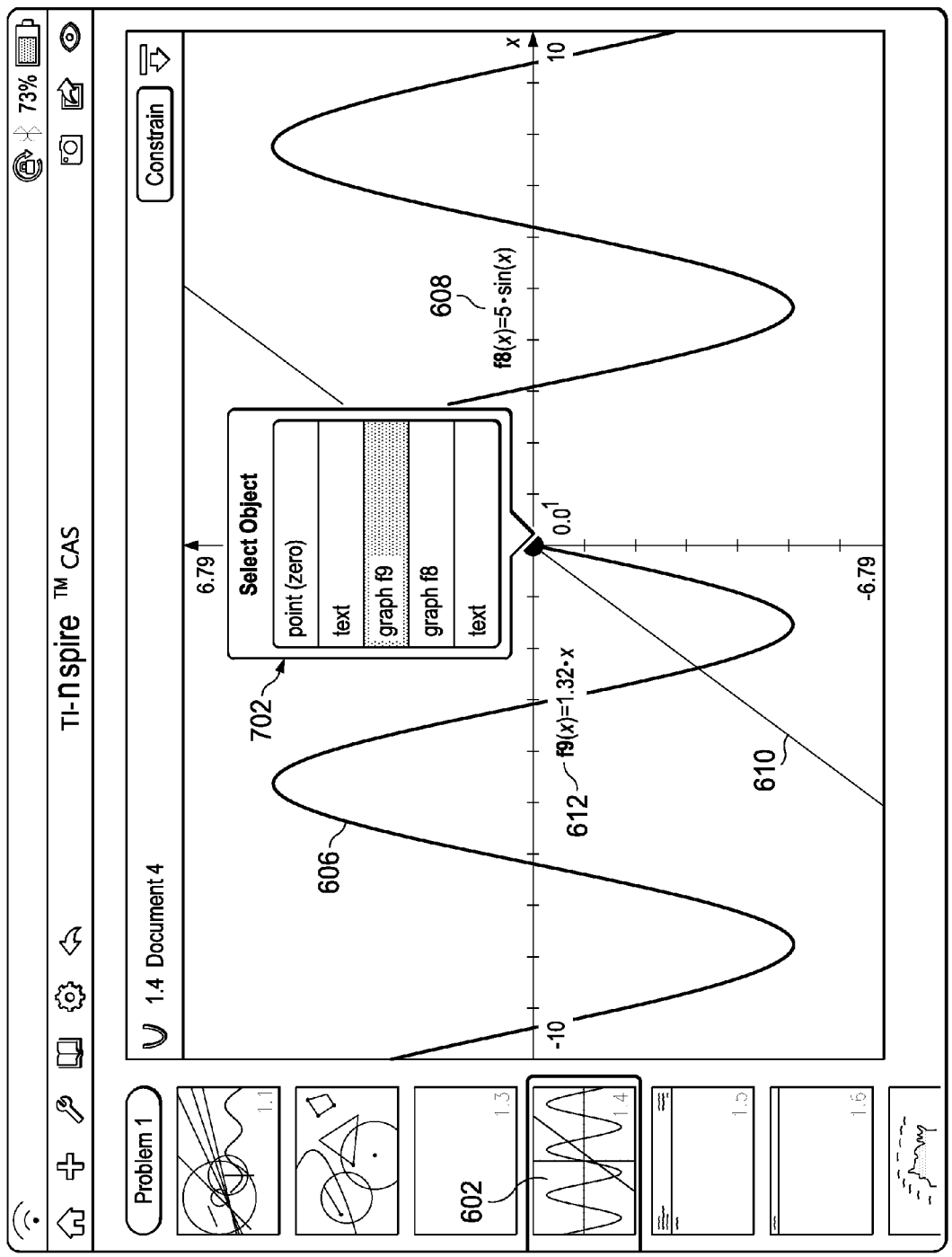
FIG. 8 is a diagram of a sixth example screen that is displayed by the display device of the system of FIG. 1.

FIG. 7 is a diagram of a fifth example screen that is displayed by the display device 102. FIG. 8 is a diagram of a sixth example screen that is displayed by the display device 102. In the example of FIGS. 7 and 8: (a) the user 210 has physically touched the coordinate (0,0) (FIG. 6) on the display device 102, so that ambiguity exists about which element (e.g., the point 604, the sine wave 606, the text 608, the line 610 or the text 612) is being targeted for selection by the physical touch; (b) in response thereto, the processor 202 causes the display device 102 to display a pop-up menu 702 for prompting the user 210 to select between such elements; and (c) the processor 202 resolves such ambiguity by receiving (from the user 210 via the menu 702) the selection between such elements, which are identified within the menu 702, without requiring the user 210 to zoom (or, subsequently, to reverse zoom) such elements as displayed by the display device 102.

As shown in FIG. 7, the processor 202 initially causes the display device 102 to highlight (e.g., by shading): (a) "point (zero)" text (instead of other text) within the menu 702; and (b) the coordinate (0,0) (instead of other elements), so that the processor 202 enables the user 210 to visually associate the coordinate (0,0) with such "point (zero)" text, which indicates the point 604 (FIG. 6). In an alternative example, as shown in FIG. 8, the processor 202 initially causes the display device 102 to highlight (e.g., by shading): (a) the "graph f9" text (instead of other text) within the menu 702; and (b) the line 610 (instead of other elements), so that the processor 202 enables the user 210 to visually associate the line 610 with such "graph f9" text. Similarly, in a different example, the processor 202 initially causes the display device 102 to highlight (e.g., by shading): (a) the "graph f8" text (instead of other text) within the menu 702; and (b) the sine wave 606 (instead of other elements), so that the processor 202 enables the user 210 to visually associate the sine wave 606 with such "graph f8" text.

If the display device 102 is displaying the example screen of FIG. 7, and if the user 210 single taps the "graph f9" text within the menu 702, then the processor 202 causes the display device 102 to instead display the example screen of FIG. 8 in response to such tapping, so that the processor 202 enables the user 210 to visually associate the line 610 with such "graph f9" text. Conversely, if the display device 102 is displaying the example screen of FIG. 8, and if the user 210 single taps the "point (zero)" text within the menu 702, then the processor 202 causes the display device 102 to instead display the example screen of FIG. 7 in response to such tapping, so that the processor 202 enables the user 210 to visually associate the coordinate (0,0) with such "point (zero)" text, which indicates the point 604 (FIG. 6).

In response to the user 210 physically touching the highlighted "graph f9" text (FIG. 8) within the menu 702, the processor 202 resolves such ambiguity by determining that the user 210 is selecting the line 610. Similarly, in response to the user 210 physically touching a highlighted "graph f8" text within the menu 702, the processor 202 resolves such ambiguity by determining that the user 210 is selecting the sine wave 606. In that manner, the processor 202 receives (from the user 210 via the menu 702) the selection between the point 604, the sine wave 606, the text 608, the line 610 and the text 612.

Figure 9:
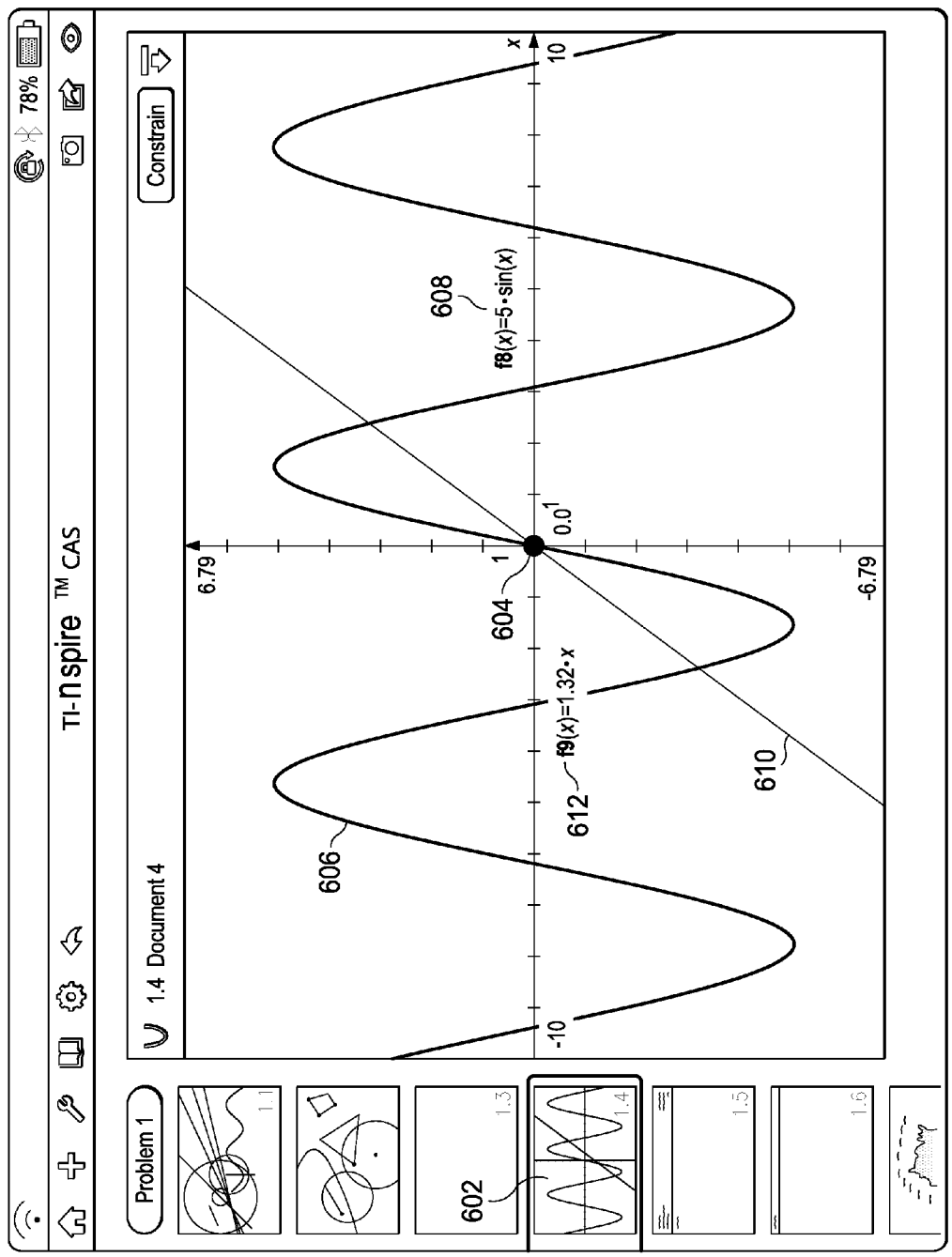
FIG. 9 is a diagram of a seventh example screen that is displayed by the display device of the system of FIG. 1.
Figure 10:
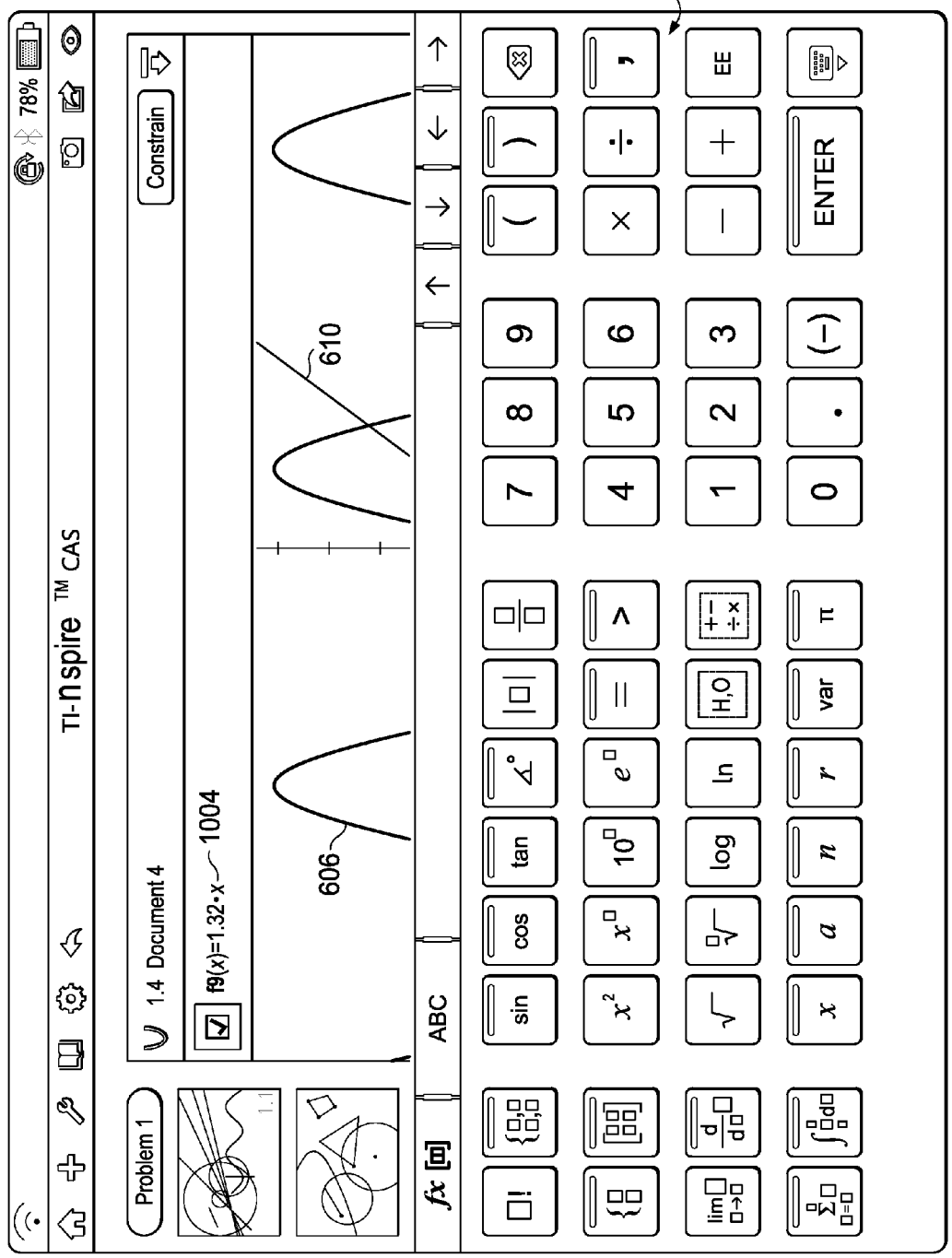
FIG. 10 is a diagram of an eighth example screen that is displayed by the display device of the system of FIG. 1.
Figure 11:
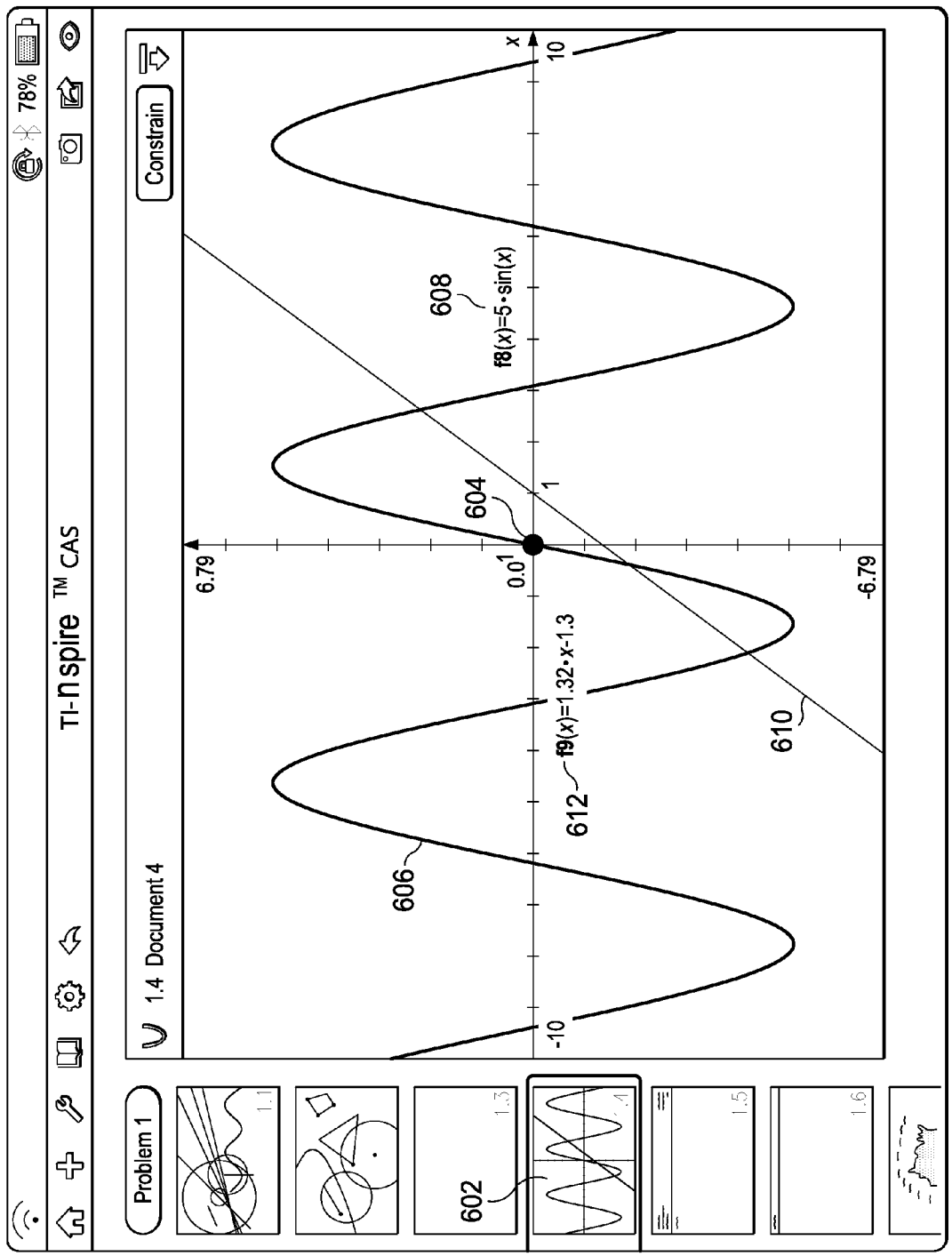
FIG. 11 is a diagram of a ninth example screen that is displayed by the display device of the system of FIG. 1.

FIG. 9 is a diagram of a sixth example screen that is displayed by the display device 102. FIG. 10 is a diagram of a seventh example screen that is displayed by the display device 102. FIG. 11 is a diagram of an eighth example screen that is displayed by the display device 102. In response to determining that the user 210 is selecting the line 610, the processor 202: (a) causes the display device 102 to clear (e.g., erase) its display of the menu 702 and to highlight (e.g., by shading) the line 610 (instead of other elements), as shown in FIG. 9; and (b) enables the user 210 to delete, cut, copy and/or revise such highlighted line 610 of FIG. 9.

In a first example of enabling the user 210 to delete, cut, copy and/or revise such highlighted line 610 of FIG. 9, the processor 202 enables the user 210 to physically touch such highlighted line 610 on the display device 102. As shown in FIG. 10, in response to the user 210 physically touching such highlighted line 610 on the display device 102, the processor 202 causes the display device 102 to display a set of keys (e.g., a virtual keyboard) 1002 for viewing (on the display device 102) by the user 210. The keys 1002 are suitable for the user 210 to operate in specifying alphanumeric text information 1004, which characterizes the function f9(x) of the line 610.

Accordingly, the user 210 operates the keys 1002 for specifying the information 1004 to the processor 202, which: (a) receives the information 1004 from the display device 102; and (b) in response thereto, causes the display device 102 to update the displayed screen in accordance with the information 1004, and causes the computer-readable medium 206 to store a record of such update. After the user 210 finishes specifying the information 1004 in that manner, the user 210 physically touches an "Enter" key (within the set of keys 1002). As shown in FIG. 11, in response to the user 210 physically touching such "Enter" key, the processor 202 causes the display device 102 to: (a) clear (e.g., erase) its display of the keys 1002; (b) reposition the line 610 (as displayed by the display device 102) in accordance with the finished information 1004; and (c) update the text 612 for showing the function f9(x)=1.32·x−1.3 of the repositioned line 610 in accordance with the finished information 1004.

In a second example of enabling the user 210 to revise such highlighted line 610 of FIG. 9, the processor 202 enables the user 210 to physically touch (e.g., by press-and-hold) and slide such highlighted line 610 on the display device 102, so that the user 210 directly repositions such highlighted line 610 (as displayed by the display device 102). In such repositioning, the processor 202 automatically: (a) recomputes the function f9(x) of the repositioned line 610; and (b) causes the display device 102 to automatically update the text 612 for showing the recomputed function f9(x) of the repositioned line 610. Accordingly, the user 210 is enabled to cause the screen of FIG. 11 by revising such highlighted line 610 in accordance with this second example and/or in accordance with the first example.

Figure 12:
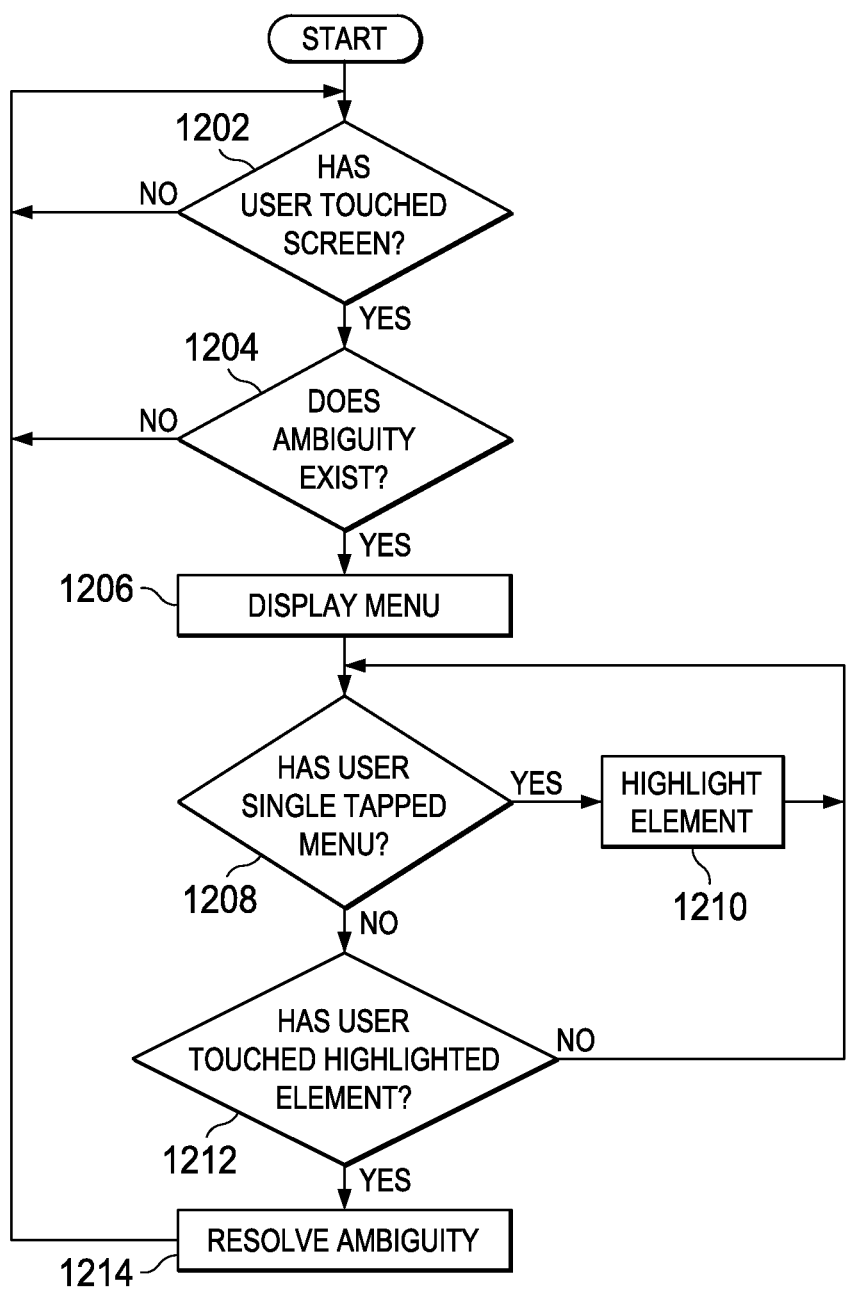
FIG. 12 is a flowchart of an operation of the system of FIG. 1.

FIG. 12 is a flowchart of an operation of the system 100. Such operation is discussed hereinabove in connection with FIGS. 3 through 11. At a step 1202, the operation self-loops until the system 100 determines that the user 210 has physically touched (e.g., single tapped) a screen of the display device 102.

In response to the system 100 determining (at the step 1202) that the user 210 has physically touched the screen of the display device 102, the operation continues from the step 1202 to a step 1204. At the step 1204, the system 100 determines whether ambiguity exists about which element is being targeted for selection by the physical touch. In response to the system 100 determining (at the step 1204) that ambiguity does not exist about which element is being targeted for selection by the physical touch, the operation returns from the step 1204 to the step 1202.

Conversely, in response to the system 100 determining (at the step 1204) that ambiguity exists about which element is being targeted for selection by the physical touch, the operation continues from the step 1204 to a step 1206. At the step 1206, the processor 202: (a) identifies (e.g., determines) which elements are displayed in close proximity to a point where the user 210 physically touched the screen of the display device 102; and (b) causes the display device 102 to display a menu for prompting the user 210 to select between only those identified elements.

In one embodiment, the processor 202 performs the first part of the step 1206 by: (a) specifying an area (on the screen of the display device 102) that is centered around a point where the user 210 physically touched the screen of the display device 102; (b) identifying which elements are at least partially displayed within the specified area (e.g., rectangular area, square area or circular area); and (c) concluding that such identified elements are the ones that are displayed in close proximity to such point. In a first embodiment, a size of the specified area is approximately equal to a size of an average human's finger tip. For example, size of an average human's finger tip can be measured in inches and then converted to different units of measurement (e.g., pixels, points, or device-independent pixels) according to density of the screen of the display device 102, such as ~44 pixels (square) on a touchscreen of APPLE Inc.'s "IPAD 2" tablet computing device. In a second embodiment, a size of the specified area is approximately equal to a size of a tip of a passive stylus object.

After the step 1206, the operation continues to a step 1208, at which the system 100 determines whether the user 210 has single tapped such menu. In response to the system 100 determining (at the step 1208) that the user 210 has single tapped such menu, the operation continues from the step 1208 to a step 1210. At the step 1210, the processor 202: (a) identifies a text portion that the user 210 has single tapped within such menu; (b) identifies an element that is associated with such identified text portion; and (c) causes the display device 102 to highlight (e.g., by shading, bolding and/or blinking) such identified text portion (instead of other text portions) and such identified element (instead of other elements), so that the processor 202 enables the user 210 to visually associate such identified text portion with such identified element. After the step 1210, the operation returns to the step 1208.

By comparison, in response to the system 100 determining (at the step 1208) that the user 210 has not single tapped such menu, the operation continues from the step 1208 to a step 1212. At the step 1212, the system 100 determines whether the user 210 has physically touched a highlighted text portion within such menu. In response to the system 100 determining (at the step 1212) that the user 210 has not physically touched a highlighted text portion within such menu, the operation returns to the step 1208.

Conversely, in response to the system 100 determining (at the step 1212) that the user 210 has physically touched a highlighted text portion within such menu, the operation continues from the step 1212 to a step 1214. At the step 1214, the processor 202: (a) identifies such highlighted text portion; (b) identifies an element that is associated with such highlighted text portion; (c) causes the display device 102 to highlight such identified element (instead of other elements); and (d) causes the display device 102 to clear (e.g., erase) its display of such menu. In that manner, the system 100 resolves such ambiguity (about which element is being targeted for selection by the physical touch) by determining that the user 210 is selecting such identified element, without requiring the user 210 to zoom (or, subsequently, to reverse zoom) such elements as displayed by the display device 102. After the step 1214, the operation returns to the step 1202.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for operating a touchscreen, the method comprising:
   detecting a location of a first physical touch within a display area of the touchscreen, wherein a plurality of elements are displayed within the display area;
   determining whether an ambiguity exists about which of the elements is being targeted by the first physical touch;
   in response to determining that the ambiguity exists, displaying a menu on the touchscreen for prompting a user to select between at least three elements that are at least partially displayed within a specified area around the location, wherein at least three portions of the menu are respectively associated with the at least three elements that are at least partially displayed within the specified area;
   in response to a second physical touch within one of the at least three portions, highlighting its respectively associated element on the touchscreen;
   in response to a third physical touch within the one of the at least three portions whose respectively associated element is highlighted on the touchscreen, resolving the ambiguity by selecting its respectively associated element as being targeted; and
   in response to resolving the ambiguity, enabling the user to perform an operation with the targeted element, wherein the operation includes at least one of deleting, cutting, copying and revising the targeted element.

2. The method of claim 1, wherein the first physical touch is at least one of: a single tap at the location; a double tap at the location; and a press-and-hold at the location.

3. The method of claim 1, wherein at least two of the at least three elements at least partially overlap with one another at the location.

4. The method of claim 1, wherein the specified area is at least one of: a rectangular area; a square area; and a circular area.

5. The method of claim 1, wherein a size of the specified area is approximately equal to a size of a finger tip.

6. The method of claim 1, wherein a size of the specified area is approximately equal to a size of a tip of a passive stylus object.

7. The method of claim 1, wherein the at least three portions include text for identifying their respectively associated elements.

8. A system for operating a touchscreen, the system comprising:
   a combination of electronic circuitry components for: detecting a location of a first physical touch within a display area of the touchscreen, wherein a plurality of elements are displayed within the display area; determining whether an ambiguity exists about which of the elements is being targeted by the first physical touch; in response to determining that the ambiguity exists, displaying a menu on the touchscreen for prompting a user to select between at least three elements that are at least partially displayed within a specified area around the location, wherein at least three portions of the menu are respectively associated with the at least three elements that are at least partially displayed within the specified area; in response to a second physical touch within one of the at least three portions, highlighting its respectively associated element on the touchscreen; in response to a third physical touch within the one of the at least three portions whose respectively associated element is highlighted on the touchscreen resolving the ambiguity by selecting its respectively associated element as being targeted; and in response to resolving the ambiguity, enabling the user to perform an operation with the targeted element, wherein the operation includes at least one of deleting, cutting, copying and revising the targeted element.

9. The system of claim 8, wherein the first physical touch is at least one of: a single tap at the location; a double tap at the location; and a press-and-hold at the location.

10. The system of claim 8, wherein at least two of the at least three elements at least partially overlap with one another at the location.

11. The system of claim 8, wherein the specified area is at least one of: a rectangular area; a square area; and a circular area.

12. The system of claim 8, wherein a size of the specified area is approximately equal to a size of a finger tip.

13. The system of claim 8, wherein a size of the specified area is approximately equal to a size of a tip of a passive stylus object.

14. The system of claim 8, wherein the at least three portions include text for identifying their respectively associated elements.

15. A computer program product for operating a touchscreen, the computer program product comprising:
   a non-transitory computer-readable storage medium; and
   a computer-readable program stored on the computer-readable storage medium, wherein the computer-readable program is processable by an information handling system for causing the information handling system to perform operations including: detecting a location of a first physical touch within a display area of the touchscreen, wherein a plurality of elements are displayed within the display area; determining whether an ambiguity exists about which of the elements is being targeted by the first physical touch; in response to determining that the ambiguity exists, displaying a menu on the touchscreen for prompting a user to select between at least three elements that are at least partially displayed within a specified area around the location, wherein at least three portions of the menu are respectively associated with the at least three elements that are at least partially displayed within the specified area; in response to a second physical touch within one of the at least three portions, highlighting its respectively associated element on the touchscreen; in response to a third physical touch within the one of the at least three portions whose respectively associated element is highlighted on the touchscreen resolving the ambiguity by selecting its respectively associated element as being targeted; and in response to resolving the ambiguity, enabling the user to perform an operation with the targeted element, wherein the operation includes at least one of deleting, cutting, copying and revising the targeted element.

16. The computer program product of claim 15, wherein the first physical touch is at least one of: a single tap at the location; a double tap at the location; and a press-and-hold at the location.

17. The computer program product of claim 15, wherein at least two of the at least three elements at least partially overlap with one another at the location.

18. The computer program product of claim 15, wherein the specified area is at least one of: a rectangular area; a square area; and a circular area.

19. The computer program product of claim 15, wherein a size of the specified area is approximately equal to a size of a finger tip.

20. The computer program product of claim 15, wherein a size of the specified area is approximately equal to a size of a tip of a passive stylus object.

21. The computer program product of claim 15, wherein the at least three portions include text for identifying their respectively associated elements.

* * * * *